United States Patent Office 3,357,959
Patented Dec. 12, 1967

3,357,959
PROCESS OF PREPARING CRYSTALLINE POLY(2-NITROPROPENE)
Harold Jabloner, Wilmington, Del., assignor to Hercules Incorporated, a corporation of Delaware
No Drawing. Filed Mar. 31, 1964, Ser. No. 356,036
1 Claim. (Cl. 260—80)

This invention relates to a new compound, high molecular weight, crystalline poly(2-nitropropene) and its method of preparation.

Low molecular weight, amorphous poly(2-nitropropene) is known. This polymer and its preparation were disclosed by A. T. Blomquist, W. J. Tapp and J. R. Johnson (J. Am. Chem. Soc., 67, 1519 (1945)). The polymer was prepared by suspending the monomer in saturated aqueous sodium bicarbonate. Repetition of this procedure gave a white powder in 75% yield. The intrinsic viscosity of this material, measured in methyl ethyl ketone at 25° C. was 0.048 dl./g. This polymer is amorphous on X-ray examination and is soluble in 1,2-dimethoxyethane.

High molecular weight crystalline poly(2-nitropropene) and a catalyst system for its method for preparation have now been discovered in accordance with this invention. The new polymer is crystalline on X-ray examination, is insoluble in 1,2-dimethoxyethane, and has intrinsic viscosities in methyl ethyl ketone at 25° C., up to 0.37 dl./g. The new polymer compound is a crystallized white solid.

Thermograms were run on the amorphous poly(2-nitropropene) and the crystalline poly(2-nitropropene). The major exotherm for both samples was from 185 to 270° C., with a maximum from 212 to 216° C. The only difference between the two samples was that the amorphous product showed a minor dip in its thermogram curve at about 175° C.

A principal object of the present invention was to prepare a polymeric material of sufficient molecular weight that it could be used in typical polymeric applications, particularly as a propellant binder and as a starting material for other derivatives such as polyaminopropenes. Material prepared according to the aforementioned literature procedure was of too low molecular weight for such applications.

Other objects of the invention will appear hereinafter, the novel features being set forth in the appended claims.

The invention is illustrated by the following example, but is not limited thereto.

EXAMPLE

Into a clean, dry, nitrogen-filled polymerization tube, capped with a self-sealing rubber septum, was placed a ball-milled slurry of solid potassium hydroxide in 1,2-dimethoxyethane. This slurry contained 0.34 millimole of potassium hydroxide and 0.093 millimole of water. The volume was then brought to 10 ml. by the addition of pure, dry 1,2-dimethoxyethane. This slurry was stirred by a magnetic stirrer and cooled to 0° C. Freshly distilled 2-nitropropene, 1 ml., was then quickly added to this slurry. The polymer precipitated as an orange gel. Fifteen minutes after the monomer addition, the tube contents were poured into acidified methanol. The polymer was then removed and dried. The polymer had an intrinsic viscosity of 0.37 dl./g. in methyl ethyl ketone at 25° C. Debye-Sherrer X-ray photographs showed the polymer to be crystalline. This procedure gave a white solid in 76% yield. The high molecular weight crystalline polymer thus formed was found suitable as a propellant binder in the presence of strong oxidants.

With reference to the example, finely comminuted potassium hydroxide initiator concentrations for the catalyst system have been varied from 0.11 mole KOH/liter of slurry to 0.0165 mole KOH/liter of slurry. Water content was varied from 5.6 to 12.3 mg. $H_2O$/ml. of slurry. These conditions gave crystalline, high molecular weight polymer with intrinsic viscosities of from 0.16 dl./g. to 0.37 dl./g. Potassium hydroxide concentrations below 0.0165 mole KOH/liter of slurry gave amorphous low molecular weight polymer in low yield. Attempted polymerization at −45° C. gave no polymer. Polymerization at 0° and 25° C. gave crystalline polymer in the form of solid in from 70 to 96% yield.

In accordance with this invention, it will be seen that there has been provided a new high molecular weight, crystalline compound having utility as a propellant binder, especially in the presence of very strong oxidants, as a starting material for the preparation of other derivatives such as polyaminopropenes, and as a film-forming material.

What I claim and desire to protect by Letters Patent is:
A process for preparing high molecular weight, crystalline poly(2-nitropropene) comprising:
(a) preparing a catalyst slurry consisting essentially of from 0.0165 to 0.11 mole of potassium hydroxide per liter, from 5.6 to 12.3 milligrams of water per milliliter, and 1,2-dimethoxyethane,
(b) adding 2-nitropropene to said catalyst slurry and polymerizing at a temperature of from about 0 to about 25° C., and
(c) recovering solid polymer product from said admixture whereby the solid polymer product is characterized by an intrinsic viscosity of from 0.16 to 0.37 deciliter per gram in methyl ethyl ketone at 25° C., insolubility in 1,2-dimethoxyethane at 25° C., and crystallinity on X-ray examination.

References Cited

Blomquist et al., JACS 67, 1519 (1945).
Yamashita et al., Kogyo Kayoku Kyokaishi 24 (1), 22–25 (1963), CA–60–4261 (C) & (D) 24 (2) 61–66.

JAMES A. SEIDLECK, *Primary Examiner.*
JOSEPH L. SCHOFER, *Examiner.*
L. WOLF *Assistant Examiner.*